(12) United States Patent
Golub et al.

(10) Patent No.: US 12,517,761 B2
(45) Date of Patent: Jan. 6, 2026

(54) SYSTEM AND METHOD FOR SCHEDULING COMPUTING TASKS ON A NETWORK OF AUTONOMOUS VEHICLES

(71) Applicant: MERCEDES-BENZ GROUP AG, Stuttgart (DE)

(72) Inventors: Maximilian Golub, Seattle, WA (US); Dinesh Ramamurthy, Issaquah, WA (US); Rodrigo Nunes, Edmonds, WA (US); Hermann Burgmeier, Seattle, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 481 days.

(21) Appl. No.: 18/013,585

(22) PCT Filed: Jun. 18, 2021

(86) PCT No.: PCT/EP2021/066699
§ 371 (c)(1),
(2) Date: Dec. 29, 2022

(87) PCT Pub. No.: WO2022/002648
PCT Pub. Date: Jan. 6, 2022

(65) Prior Publication Data
US 2023/0281046 A1    Sep. 7, 2023

(30) Foreign Application Priority Data
Jun. 30, 2020   (GB) ..................................... 2009986

(51) Int. Cl.
*G06F 9/46*     (2006.01)
*G06F 9/50*     (2006.01)
(52) U.S. Cl.
CPC ................................ *G06F 9/5027* (2013.01)

(58) Field of Classification Search
CPC ................ G06F 9/4027; G06F 9/5072; G06F 2209/5011; G06F 2209/5014;
(Continued)

(56) References Cited

U.S. PATENT DOCUMENTS

2019/0075157 A1    3/2019  Reber
2020/0027354 A1*   1/2020  Goldman ....... G06Q 10/063118
(Continued)

FOREIGN PATENT DOCUMENTS

EP    3608779 A1    2/2020
KR    101957343 B1  3/2019

OTHER PUBLICATIONS

Ghazizadeh, Resource Allocation in Vehicular Cloud Computing, 2014, Old Dominion University, DOI: 10.25777/37cf-5q84, 151 pages. (Year: 2014).*

(Continued)

*Primary Examiner* — Diem K Cao
(74) *Attorney, Agent, or Firm* — PATENT PORTFOLIO BUILDERS PLLC (57) ABSTRACT

One or more autonomous vehicles are clustered into one or more microgrids and at least one computing task is scheduled on at least one microgrid. Activation signals are received from a client of one or more autonomous vehicles when the vehicles are plugged into charging stations. Utilization rates of the autonomous vehicles are determined based on a set of parameters, which includes at least one of location of the autonomous vehicle and time. The autonomous vehicles are clustered into one or more microgrids of autonomous vehicles based on the utilization rates. At least one request for performing at least one computing task is received from a user device. The at least one request includes an estimated runtime of the at least one computing task. The at least one computing task is scheduled on at least (Continued)

one microgrid of autonomous vehicles based on the estimated runtime.

6 Claims, 5 Drawing Sheets

(58) Field of Classification Search
CPC ....... G06F 2209/5019; G06F 2209/509; H04L 67/10; G06Q 50/30; H04W 4/40
See application file for complete search history.

(56) References Cited

U.S. PATENT DOCUMENTS

2020/0128066 A1   4/2020  Sugimoto
2021/0245773 A1*  8/2021  Lu ...................... B60R 16/0232

OTHER PUBLICATIONS

Nabi et al., Resource Assignment in Vehicular Clouds, IEEE, 2017, 6 pages. (Year: 2017).*
Office Action dated Jan. 26, 2024 in related/corresponding EP Application No. 21 735 899.3.
International Search Report and Written Opinion mailed Oct. 29, 2021 in related/corresponding International Application No. PCT/EP2021066699.
Search Report dated Nov. 6, 2020 in related/corresponding GB Application No. 2009986.7.
Whaiduzzaman et al.; "A survey on vehicular cloud computing;" Journal of Network Computer Applications; Apr. 2014; pp. 328-344; vol. 40.

* cited by examiner

SYSTEM AND METHOD FOR SCHEDULING COMPUTING TASKS ON A NETWORK OF AUTONOMOUS VEHICLES

TECHNICAL FIELD

The present disclosure relates to the field of cloud networking. More particularly, the present disclosure describes a system and a method for clustering autonomous vehicles into microgrids and scheduling tasks on the microgrids.

BACKGROUND

Autonomous vehicles are mobile supercomputers having a higher computing potential as compared to other vehicles, however this computing potential comes at a significant increase in cost over non-autonomous vehicles. Autonomous vehicles also have periods of unused downtime of several hours per stay at destination and home locations. While these vehicles are not being used, this computing potential resource is idle. In order to recoup the cost of an autonomous vehicle and to utilize their potential more efficiently, user access may be provided as a service to the computing resources of vehicle. So far, however, it is difficult to provide user access and harness this computing potential for several reasons: autonomous vehicles may be geographically distant from each other and potential users, isolation and security of potential computing workloads is difficult to orchestrate, and the dynamic nature of when an autonomous vehicle is parked and idle versus when it is driving is difficult to predict incorporate into a computing power usage scheme.

Therefore, there exists a need in the art for a technique to provide users access to the resources of these autonomous vehicles so the resources of the autonomous vehicles may be utilized more efficiently.

SUMMARY

The present disclosure overcomes one or more shortcomings of the prior art and provides additional advantages. Embodiments and aspects of the disclosure described in detail herein are considered a part of the claimed disclosure.

In one non-limiting embodiment of the present disclosure, a method for clustering one or more autonomous vehicles into one or more microgrids and scheduling at least one task on at least one microgrid is described. The autonomous vehicles have computing potential that can be utilized to perform computing tasks when they are not being used for transportation. When the autonomous vehicles are plugged in for charging at charging stations, activation signals from the autonomous vehicles are received by a cloud-based control system. Thereafter, the autonomous vehicles are clustered into one or more microgrids based on the location of the autonomous vehicles and the time of day. Further, the method describes that a request for performing at least one task is received from a user device, which comprises an estimated runtime of the task. The task is scheduled on at least one microgrid of autonomous vehicles based on the estimated runtime.

In case an autonomous vehicle in the microgrid is reserved for transportation, the cloud-based control system receives a reservation signal from the autonomous vehicle. In response, the cloud-based control system can hold back the autonomous vehicle of the microgrid. The autonomous vehicle can also be incentivized by the user to stay on the microgrid and complete the allocated task.

In another non-limiting embodiment of the present disclosure, a system for clustering one or more autonomous vehicles into one or more microgrids and scheduling at least one task on the at least one microgrid is described. The system comprises at least a management unit and a scheduler coupled with the management unit. When the autonomous vehicles are plugged in for charging at the charging stations, the management unit receives activation signals from a client of one or more autonomous vehicles. Thereafter, the management unit clusters the autonomous vehicles into one or more microgrids based on the locations of the autonomous vehicles and the time of day. A task request along with the estimated runtime for performing at least one task is received by the management unit. The scheduler schedules the at least one task on at least one microgrid of autonomous vehicles based on the estimated runtime.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying Figs., in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject-matter described herein as "exemplary" is not necessarily to be construed as preferred or advantageous over other embodiments.

While the disclosure is susceptible to various modifications and alternative forms, specific embodiments thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", "include(s)", or any other variations thereof, are intended to cover a non-exclusive inclusion, such that a setup, system, or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure will be described herein below with reference to the accompanying drawings. In the following description, well known functions or constructions are not described in detail since they would obscure the description with unnecessary detail.

The present disclosure relates to a system that clusters autonomous vehicles into one or more microgrids of autonomous vehicles in an efficient manner based on their transportation utilization rate. An autonomous vehicle (AV), also known as a self-driving car, connected and autonomous vehicle (CAV), driverless car, robo-car, ego vehicle, or robotic car, is a vehicle that is capable of sensing its environment and moving safely with little or no human input. A robo-taxi is also an autonomous vehicle meant for public use. The disclosure relates to a system that receives one or more tasks from a user and schedules them on one or more microgrids of autonomous vehicles. When the autonomous vehicles that form part of the microgrid are robo-taxis i.e., a fleet of similar autonomous vehicles that are shared between many transportation users for short transportation tasks, the system can hold back one or more robo-taxis that are involved in a computing task to make sure they remain in the microgrid to complete a requested computing task as long as transportation demand can be met with other robo-taxis. Maintaining a vehicle within the microgrid in this manner until a discrete computing task is completed will decrease the amount of time it takes to complete the computing task.

Figure 1:
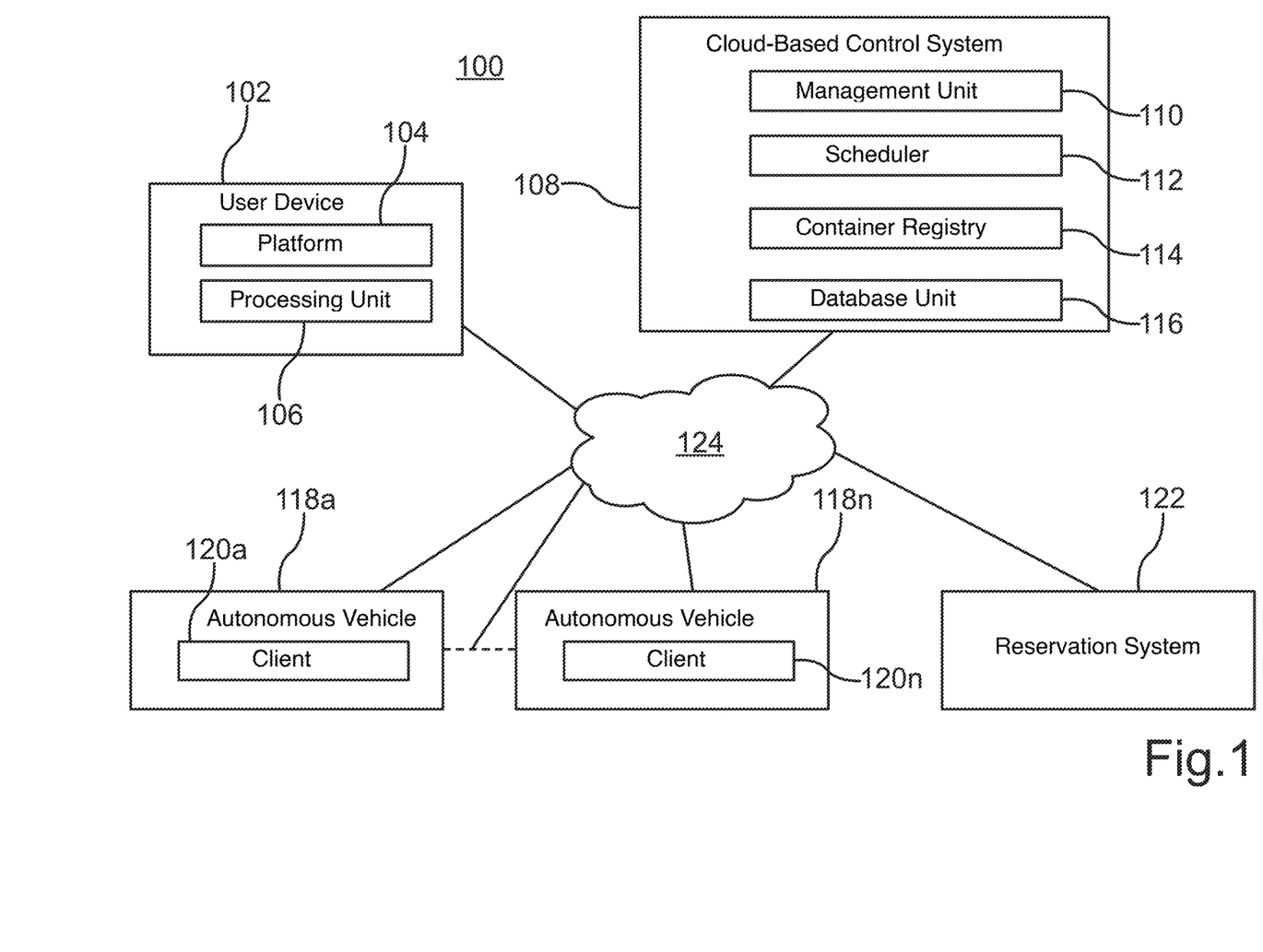
FIG. 1 shows a block diagram illustrating a network for clustering autonomous vehicles into one or more microgrids of autonomous vehicles and scheduling one or more tasks on the one or more microgrids, in accordance with an embodiment of the present disclosure.

Referring to FIG. 1, an exemplary network 100 is disclosed for clustering autonomous vehicles into one or more microgrids of autonomous vehicles and scheduling one or more tasks on the one or more microgrids. The network 100 may include at least one of the Internet, a local area network, a wide area network, an intranet, a peer-to-peer network, and/or other similar technologies for connecting various entities as discussed below. In an aspect, various elements/entities such as a user device 102, a cloud-based control system 108, autonomous vehicles 118a, 118b . . . 118n (alternatively referred to as autonomous vehicle(s) 118), and a reservation system 122 may communicate within the network 100 through the cloud 124.

According to a non-limiting exemplary embodiment of the present disclosure, the autonomous vehicles 118 may have high end processing units such as graphical processing units (GPUs) and central processing units (CPUs). The autonomous vehicles 118 will have computing resources with processing potential that is typically greater than non-autonomous vehicles. The autonomous vehicles 118 can also be termed as mobile supercomputers that have an unused downtime of several hours per say due to lack of owner or passenger demand throughout different times of the day.

In the same embodiment, each of the autonomous vehicles 118a, 118b . . . 118n may include a respective client 120a, 120b . . . 120n (alternatively referred to as client(s) 120) which serves as the single iteration point with the rest of the cloud-based control system 108. When the autonomous vehicles 118 are plugged into one or more charging stations (not shown in the Figs.), a client 120 of the autonomous vehicles 118 may transmit an activation signal to the cloud-based control system 108 to indicate that the autonomous vehicles 118 are going to be in an idle state for a certain time duration. Thus, the resources of the autonomous vehicles 118 may be utilized for performing any computing task such as machine learning jobs, but not limited thereto, as per the requirement of the computing task user(s). Upon receiving the activation signal, the cloud-based control system 108 may come to know that the autonomous vehicles 118 are available to be added to a pool of the vehicles for performing one or more computing tasks.

The cloud-based control system 108 may comprise of a management unit 110, a scheduler 112, a container registry 114, and a database unit 116. The management unit 110 may receive the activation signal from the autonomous vehicles 118 via an input interface (not shown in the Figs.). Upon receiving the activation signal, the management unit 110 may determine utilization rates of the autonomous vehicles 118. In an exemplary embodiment, the utilization rate signifies the average rate of utilization or demand of an autonomous vehicle 118 as a means of transportation. In other words, the utilization rate defines a time period for which the autonomous vehicle 118 is going to be used for transportation. By knowing the utilization rate the management unit 110 can determine the time period for which the autonomous vehicle 118 can be utilized for performing the computing tasks.

In the same embodiment, the management unit 110 may determine the utilization rates based on a location of the autonomous vehicles 118 and a time of day. The autonomous vehicles 118 within certain areas may have a high utilization rate and within other certain areas may have a low utilization rate. Further, during certain time periods of the day the autonomous vehicles 118 may be high in demand and at other time periods the autonomous vehicles 118 may be less in demand. Thus, the utilization rate of the autonomous vehicles 118 varies according to their location and time of the day. In an exemplary embodiment, the time may also signify weekdays, weekends, holidays, seasons, festivals, etc. Further, the management unit 110 may determine the utilization rates of the autonomous vehicles 118 using the locations and time based on the historical data stored in the database unit 116 of the cloud-based control system 108. The utilization rates may be defined as a low utilization rate, medium utilization rate or high utilization rate based on a first threshold and a second threshold. For the ease of understanding, the utilization rates of the present invention are divided into the three previously stated categories, however there may be more categories of utilization rates. Further, the database unit 116 may store the following information, but is not limited to: location information and timing information in association with the historical utilization rates of the autonomous vehicles 118.

After determining the utilization rates of the autonomous vehicles 118, the management unit 110 may cluster the autonomous vehicles 118 into one or more microgrids of autonomous vehicles. In an exemplary embodiment, the management unit 110 may cluster the autonomous vehicles 118 based on their utilization rates. The management unit 110 may cluster autonomous vehicles 118 of the same utilization rates into one microgrid. For example, an autonomous vehicle having a utilization rate less than the first threshold is considered to be of a low utilization rate and may be clustered into a microgrid of autonomous vehicles of low utilization rates. Further, an autonomous vehicle having a utilization rate less than the second threshold is considered to be of high utilization rate and may be clustered into a microgrid of autonomous vehicles of high utilization rates. Furthermore, an autonomous vehicle that has a utilization rate in between the first and second threshold is considered to be of medium utilization rate and may be clustered into a microgrid of autonomous vehicles of medium utilization rates. In this manner, all the autonomous vehicles 118 are clustered into one or more microgrids of autonomous vehicles based on their utilization rates.

Further, the management unit 110 of the cloud-based control system 108 may receive at least one request for performing at least one computing task from a user device 102. The user device 102 of the user may include a platform 104 and a processing unit 106. The user interested in using the cloud-based control system 108 for running their computing task may be provided with a platform as a service (PaaS) like a user interface but is not limited thereto. The user may register at the cloud-based control system 108 and use the platform 104 for posting the at least one computing task. After registration, the user may download a software development kit (SDK) for building custom tasks. Thereafter, the user may build docker images of the computing tasks using the SDK. This allows the user to submit a single, stand-alone computing task with all libraries and dependencies encapsulated. These images may be built on a preconfigured base image provided as part of the SDK that incorporates all necessary drivers and device configurations.

Further, the user may deploy their images to a container registry 114. The container registry 114 may be part of the cloud-based control system 108 or may be outside of the cloud-based control system 108. Further, the user may provide a set of information such as, but not limited to: the computing task specification information, container registry information, minimum computation resource limits, or the estimated task runtime via the platform 104 of the user device 102.

Upon receiving the information from the user via the user device 102, the scheduler 112 may determine at least one microgrid among the one or more microgrids of autonomous vehicles 118 using deep learning for predictively scheduling the at least one computing task. The scheduler 112 may determine the at least one microgrid based on the utilization rates of the one or more microgrids and a set of parameters such as the estimated runtime of the at least one computing task. The scheduler 112 may also consider the minimum resource limits provided by the user while determining the at least one grid for scheduling the at least one computing task.

The runtime information is vital to the cloud-based control system 108, because unlike the standard cloud, one or more microgrids are much more dynamic. When an autonomous vehicle 118 is disconnected from a charging station (not shown in the Figs.) for any reason, or an autonomous vehicle 118 comes to park at the charging station, the corresponding microgrid shrinks or grows in size. When shrinking occurs, computing tasks scheduled on that microgrid need to be halted and moved to a different microgrid or stopped until they are rescheduled on a larger microgrid. Thus, by determining the at least one microgrid based on the utilization rate and estimated runtime of the computing task, the scheduler 112 may schedule the at least one task onto the most optimum microgrid of the autonomous vehicles 118. The scheduler 112 may schedule the at least one computing task in such a manner that prevents the at least one computing task from frequently being rescheduled. In an exemplary embodiment, computing tasks with a short runtime may be scheduled on the microgrid having a high utilization rate, computing tasks with a normal runtime may be scheduled on the microgrid having a medium utilization rate, and computing tasks with a long runtime may be scheduled on the microgrid having a low utilization rate.

In the same embodiment, for example, a user may define a computing task requiring a microgrid of four autonomous vehicles 118 for two hours. In this example, in the Seattle downtown core, it is unlikely that a microgrid of four autonomous vehicles 118 can be kept parked for two hours. In contrast, it is far more likely that a microgrid of four autonomous vehicles 118 in the suburbs of Seattle will remain unused for a transportation task for a longer time period due to a lower population and request density, based on a time of day and other factors.

In an exemplary embodiment, the scheduler 112 may schedule the at least one computing task based on the location of the user device 102 and location of the one or more microgrids. The scheduler 112 may schedule the at least one computing task requested on a user device 102 at the nearest microgrid location of autonomous vehicles 118. In this manner, the cloud-based control system 108 may distribute computing tasks across several autonomous vehicles 118 to take advantage of the performance benefits of distributed computing. Further, the scheduler 112 uses deep learning to predictively schedule computing tasks to their most optimal microgrids based on their estimated runtimes, which prevents computing tasks from being frequently rescheduled.

Figure 2:
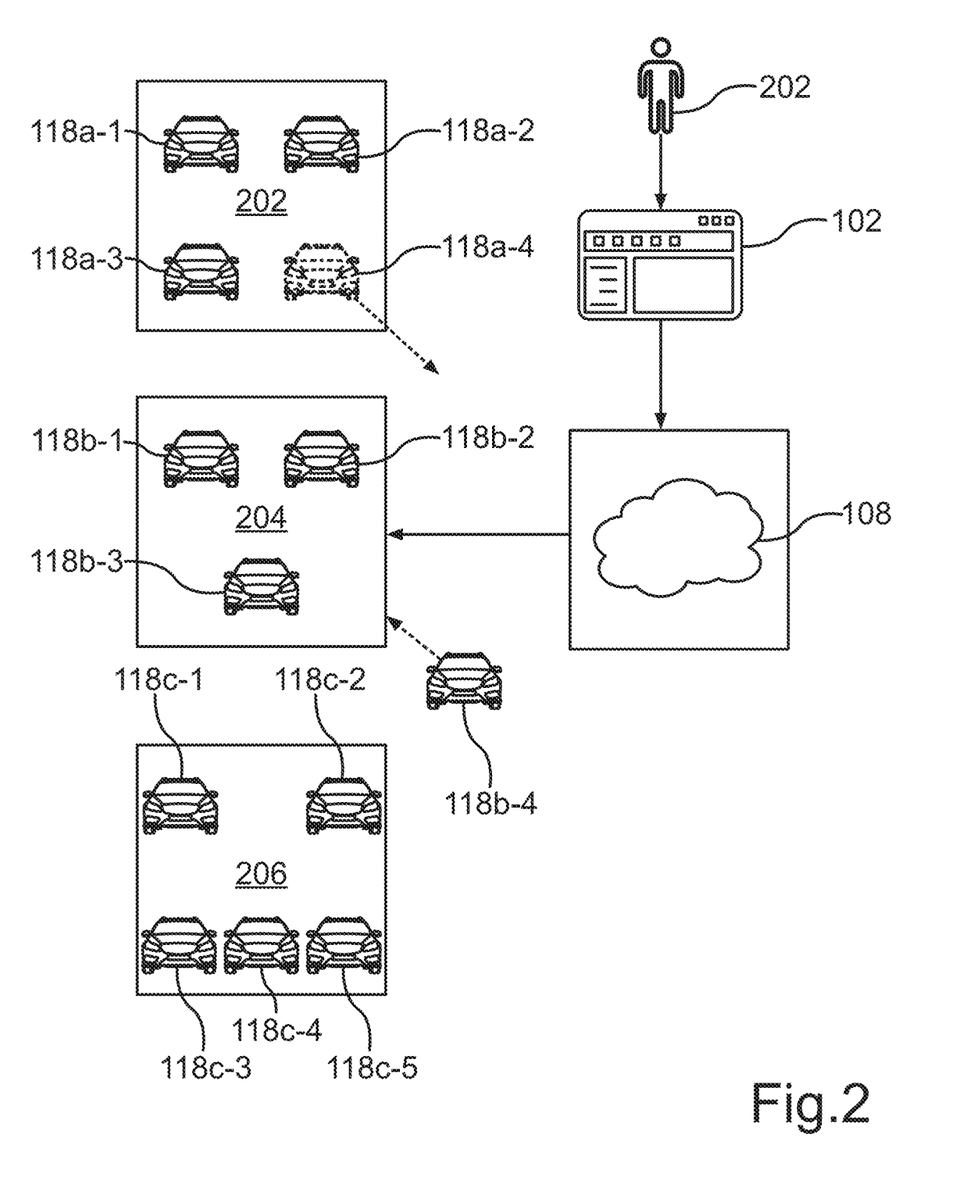
FIG. 2 shows a block diagram illustrating a scenario where the size of one or more microgrids of autonomous vehicles changes dynamically in accordance with an embodiment of the present disclosure.

FIG. 2 of the present disclosure illustrates the scenario where the size of one or more microgrids of autonomous vehicles 118 changes dynamically. In FIG. 2, three microgrids of autonomous vehicles 118 such as microgrid A, microgrid B, and microgrid C are shown. Initially, there are four autonomous vehicles 118*a* 1-4 in microgrid A, three autonomous vehicles 118*b* 1-3 in microgrid B, and five autonomous vehicles 118*c* 1-5 in microgrid C. In an exemplary embodiment, a user 202 may provide computing task specification information along with container registry information, minimum computation resource limits, and an estimated computing task runtime via the platform 104 to the cloud-based control system 108. For example, the user 202 may indicate that the minimum computation resource may be provided by four autonomous vehicles. Accordingly, the cloud-based control system 108 may schedule the computing task on microgrid A which has four autonomous vehicles 118*a* 1-4 in order to efficiently utilize available resources in the network.

However, before completion of the computing task, an autonomous vehicle 118*a*-4 of microgrid A may get reserved via the reservation system 122 for a transportation task. The reservation system 122 will notify the client 120 of the autonomous vehicle 118*a*-4 about the reservation for the transportation task. Thereafter, the client 120 may inform the cloud-based control system 108 that the autonomous vehicle 118*a*-4 is reserved for a transportation task and may leave microgrid A soon. Thus, computing tasks scheduled on the autonomous vehicle 118*a*-4 need to be halted and rescheduled. In response, the cloud-based control system 108 may hold back the autonomous vehicle 118*a*-4 from performing the transportation tasks as long as the transportation task reservation of the vehicle 118*a*-4 can be completed by another autonomous vehicle 118*n* present in the network. The cloud-based control system 108 may notify the reservation system 122 about holding back the autonomous vehicle 118*a*-4 from performing the transportation task and may enquire whether the transportation task reservation can be completed by another autonomous vehicle 118*n*. If the reservation system 122 confirms that the transportation task reservation of the autonomous vehicle 118*a*-4 can be completed by another autonomous vehicle 118*n*, the cloud-based control system 108 will hold back the autonomous vehicle 118*a*-4 to at least complete the computing task it had already started performing.

In the same embodiment, if the transportation task reservation cannot be completed by any other autonomous vehicles 118*n*, the cloud-based control system 108 may notify the user 202 via the user device 102 that the computing task is going to be halted for a while. The cloud-based control system 108 may also provide the user 202 a base monetary value assigned to the autonomous vehicle 118*a*-4. The user 202 may monitor their requested computing task progress via the platform 104 and may provide an incentive such as a monetary amount they are willing to pay to retain the autonomous vehicle 118*a*-4 in microgrid A to complete their requested computing task. This prevents microgrid A from being modified before the completion of the at least one computing task scheduled thereon.

In an embodiment, the user 202 may be provided with the base monetary value that is assigned to an autonomous vehicle 118*a*-4 within for example microgrid A that is carrying out a computing task. The base monetary value may be calculated based on the utilization of the autonomous vehicles 118*a* 1-4 in the local area and time of day. In an embodiment the base monetary value may be based on the type of the autonomous vehicle 118*a*-4, e.g., sedan, saloon, hatchback, etc. being used for the computing task. In another embodiment, the base monetary value may be quoted by the owner of the autonomous vehicle 118*a*-4. The user 202 may offer or bid a monetary amount for retaining the autonomous vehicle 118*a*-4 to stay within microgrid A. The offer or bid may be a monetary amount equal to the base monetary value or a monetary amount more than the base monetary value. Based on received monetary incentive information that is equal to or above the base monetary value, the autonomous vehicle 118*a*-4 may be retained in the microgrid A until the completion of the computing task. However, the autonomous vehicle 118*a*-4 may also deny staying in microgrid A if the received monetary incentive information is below the provided base monetary value of autonomous vehicle 118*a*-4. In an alternative embodiment, the user 202 and the owner of autonomous vehicle 118*a*-4 may reach an agreement on the monetary offer or bid amount to retain the autonomous vehicle 118*a*-4 in the microgrid A.

In this manner, the cloud-based control system 108 retains the autonomous vehicles 118 in a microgrid, in case any autonomous vehicle 118 is being reserved or scheduled by another user for transporting them to a destination before completion of a computing task. The process described above prevents the holding and rescheduling of a computing task.

Referring again to FIG. 2, the size of the microgrid of autonomous vehicles 118 may change due to an autonomous vehicle 118*b*-4 being added to the microgrid such as in the example case of microgrid B. In this example, the autonomous vehicle 118*a*-4 of microgrid A decides to leave microgrid A. A computing task scheduled for microgrid A may then need to be rescheduled to another microgrid that includes four autonomous vehicles 118. In such a case, the cloud-based control system 108 may reschedule the remaining uncompleted computing task to microgrid B which, due to the addition of autonomous vehicle 118*b*-4, now has four autonomous vehicles 118*b* 1-4. In this manner, the computing task assigned to one microgrid may be rescheduled to another microgrid whenever microgrid sizes change in order to ensure that the computing task assigned by the user is completed in a timely manner without undue reduction in computing efficiency and without prolonged interruption of the computing task. In another embodiment, different autonomous vehicles 118 may have different processing capabilities. In such a case the cloud-based control system 108 may look for a microgrid which has in total the same processing capability as an existing microgrid for rescheduling the computing tasks.

Figure 3:
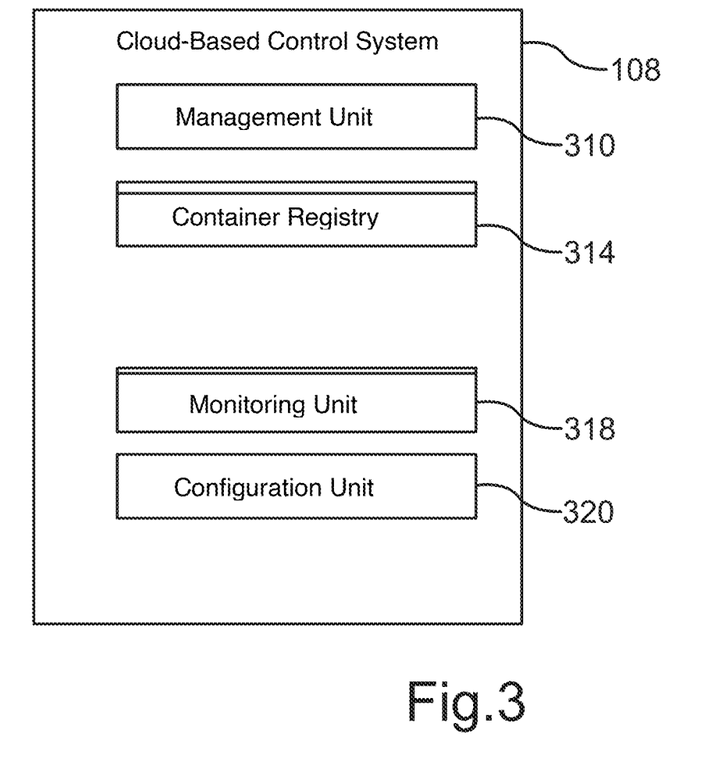
FIG. 3 shows a block diagram illustrating the system for clustering one or more autonomous vehicles into one or more microgrids and scheduling tasks thereon, in accordance with an embodiment of the present disclosure.

FIG. 3 illustrates a block diagram of the cloud-based control system 108 for clustering one or more autonomous vehicles 118 into one or more microgrids and scheduling computing tasks thereon. The cloud-based control system 108 comprises various elements/entities such as a management unit 310, a scheduler 312, container registry 314, a database unit 316, a monitoring unit 318, and a configuration unit 320. The various entities of the cloud-based control system 108 may communicate with each other through wireless communication or wired communication.

In an embodiment, the management unit 310 may perform the various functions as described in the previous paragraphs. According to an embodiment, the management unit 310 may receive activation signals from clients 120 of one or more autonomous vehicles 118, when the one or more autonomous vehicles 118 are plugged in for charging at one or more charging stations. In an exemplary embodiment, the client 120 is a program running on the autonomous vehicle's hardware and is responsible for communicating with the cloud-based control system 108 to indicate that the autonomous vehicle 118 is available for scheduling jobs. The client 120 is also responsible for communicating with the hardware device in the autonomous vehicles 118 to schedule a task whenever it receives a task from the scheduler 312. Further, the management unit 310 may determine utilization rates of the one or more autonomous vehicles 118 based on a set of parameters. The set of parameters may comprise at least one of: location of an autonomous vehicle 118 and time, but the parameters are not limited thereto. Further, the management unit 310 may cluster the one or more autonomous vehicles 118 into one or more microgrids of autonomous vehicles based on the utilization rates of the one or more autonomous vehicles 118. Furthermore, the management unit 310 may receive at least one computing task request from a user device 102 for performing at least one computing task. The at least one computing task request may comprise the following information but is not limited thereto: computing task specification information, container registry information, minimum computation resource limits, and estimated task runtime.

In an embodiment, the scheduler 312 may schedule the at least one computing task on at least one microgrid of autonomous vehicles 118 based on the estimated runtime of the at least one computing task. In an exemplary embodiment, the scheduler 312 may schedule computing tasks with short runtimes on a microgrid having a high utilization rate. Further, the scheduler 312 may schedule computing tasks with average runtime on a microgrid having a medium utilization rate and may schedule computing tasks with long runtimes on a microgrid having a low utilization rate.

Further, the monitoring unit 318 may continuously monitor the progress of each computing task scheduled on each microgrid and may continuously provide an update of the scheduled computing tasks to the user(s). In another embodiment, the user(s) may be able to receive a live update of the computing task on a platform 104 available on the user device 102. Furthermore, the configuration unit 320 manages software settings and configurations for bootstrapping the in-vehicle hardware to install and run computing tasks on it. The configuration unit 320 is also responsible, for example, for installing the client 120 and its dependencies on the autonomous vehicles 118 and updating software versions of the client 120 and its dependencies whenever necessary. Further, the database unit 316 may store the following information, but is not limited to: location information, and timing information in association with the historical utilization rates of the autonomous vehicles 118. Furthermore, the container registry 314 may store docker images of the computing tasks deployed by the users. A docker image is a specific packaged version of the computing task. According to an embodiment, each of the elements/entities of the cloud-based control system 108 may comprise a processing unit and memory.

Figure 4:
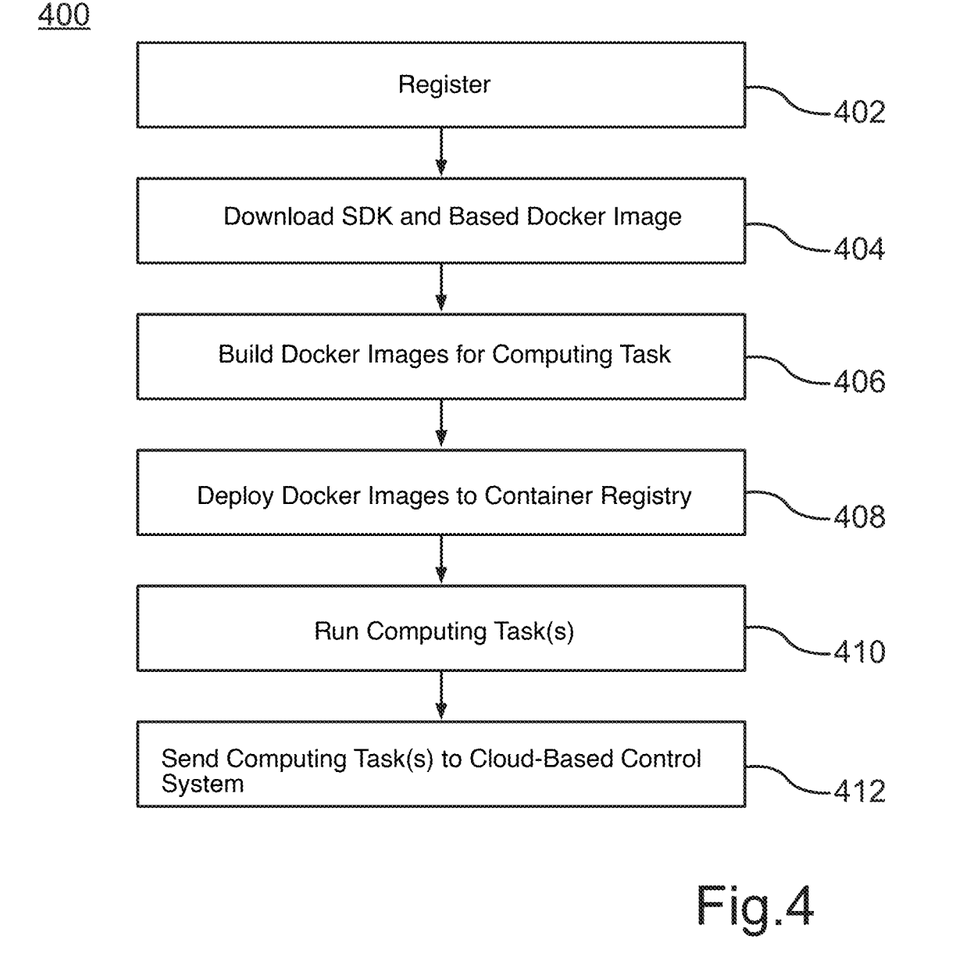
FIG. 4 shows a block diagram illustrating a flow chart of a process for assigning, by a user, a task on microgrids of autonomous vehicles, in accordance with an embodiment of the present disclosure.

FIG. 4 illustrates a flow chart process for assigning, by a user, a computing task on microgrids of autonomous vehicles 118. For users interested in using a cloud-based control system 108 for running their computing tasks such as machine learning jobs, the platform 104 may provide a Platform as a Service (PaaS), but not limited thereto. At step 402, a user may register on their user device 102, just like they would register with any other cloud service. At step 404, the user may download a software development kit (SDK) and base docker image for building their custom computing task workloads. At step 406, the user may build docker images for a computing task using the SDK and the base docker image. At step 408 the process 400 describes that the user deploys the docker images to a container registry 114 for storing the docker images.

At step 410, the user may run the computing task(s) via the platform 104 by providing computing task specification information, container registry information, and minimum computational resource limits. At step 412, the process 400 describes that the processing unit 106 of the user device 102 may send the computing task(s) to the cloud-based control system 108 by making an API call. In response, the cloud-based control system 108 schedules the computing task(s) on a microgrid based on the computing task(s) specification or the location of the user device 102 or both. In this manner, the user may easily and efficiently assign one or more tasks on the cloud-based control system 108 as per the requirement of the user.

Figure 5:
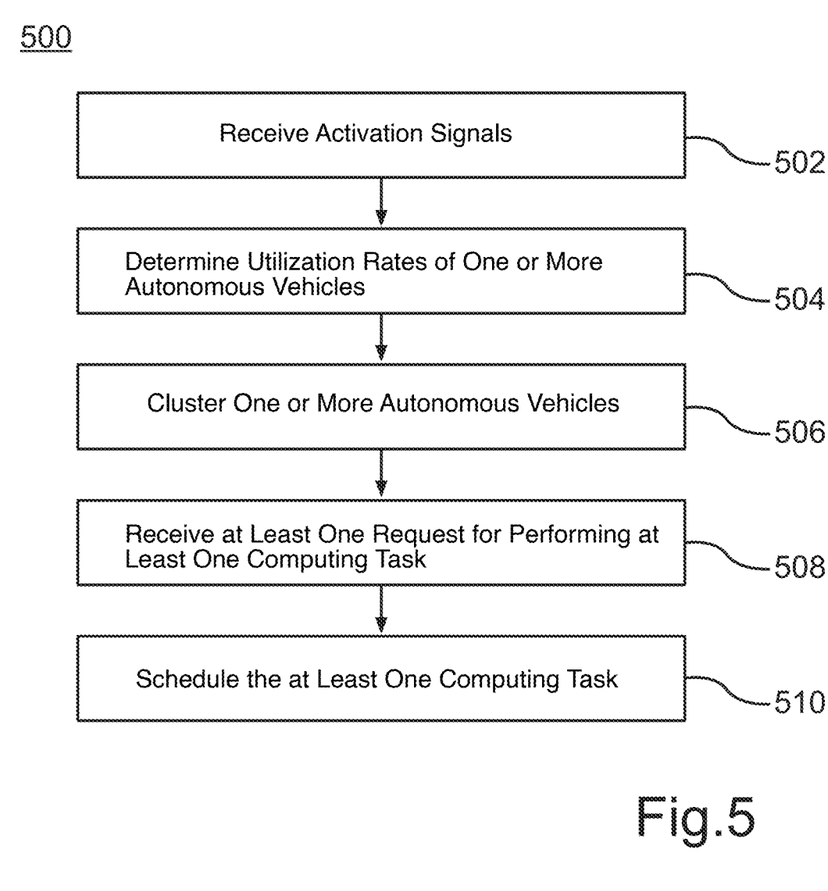
FIG. 5 shows a flowchart of an exemplary method of clustering one or more autonomous vehicles into one or more microgrids and scheduling at least one task on at least one microgrid among the one or more microgrids, in accordance with an embodiment of the present disclosure.

FIG. 5 discloses a process of clustering one or more autonomous vehicles 118 into one or more microgrids and scheduling at least one computing task on at least one microgrid among the one or more microgrids. At step 502, activation signals from clients 120 of one or more autonomous vehicles 118 may be received by a management unit 110 of the cloud-based control system 108. The activation signals may be received when the one or more autonomous vehicles 118 are plugged in for charging at one or more charging stations in the network 100. The client 120 is a single iteration point within the rest of the cloud-based control system 108, which handles running, monitoring, and stopping computing tasks, as well as reporting if the autonomous vehicle 118 is reserved. After one or more autonomous vehicles 118 are plugged into the one or more charging stations, the client 120 of the autonomous vehicles 118 transmits activation signals to the cloud-based control system 108 to indicate that the autonomous vehicles 118 are going to be in an idle state for a certain time duration. Thus, the resources of the autonomous vehicles 118 may be utilized for performing any computing task as per the requirement of the users. Upon receiving the activation signals, the cloud-based control system 108 may come to know that the autonomous vehicles 118 are available to be added to a pool of the autonomous vehicles 118 for performing one or more computing tasks.

At step 504, the management unit 110 may determine utilization rates of the one or more autonomous vehicles 118 based on a set of parameters, wherein the set of parameters comprises at least one of location of the autonomous vehicle 118 and time. The utilization rate of the autonomous vehicle 118 varies according to the location and time of the day. In an exemplary embodiment, the time may also signify weekdays, weekends, holidays, etc. The management unit 110 may determine the utilization rates of the autonomous vehicles 118 using the locations and time based on the historical data stored in the database unit 116 of the cloud-based control system 108. The utilization rates may be defined as a low utilization rate, medium utilization rate, and short utilization rate based on a first threshold and a second threshold. For example, an autonomous vehicle 118 having a utilization rate less than the first threshold is considered to have a low utilization rate. An autonomous vehicle 118 having a utilization rate more than the second threshold is considered to have a high utilization rate. Furthermore, an autonomous vehicle 118 having a utilization rate between the first and second thresholds is considered to have a medium utilization rate.

At step 506, the management unit 110 based on the utilization rates of the one or more autonomous vehicles 118 clusters the one or more autonomous vehicles 118 into one or more microgrids. The management unit 110 may cluster an autonomous vehicle 118 with a low utilization rate into a first microgrid of autonomous vehicles 118. The management unit 110 may cluster an autonomous vehicle 118 with a medium utilization rate into a second microgrid of autonomous vehicles 118. The management unit 110 may cluster an autonomous vehicle 118 with a high utilization rate into a third microgrid of autonomous vehicles 118. At step 508, the management unit 110 receives at least one request for performing at least one computing task from a user device 102. The request comprises: computing task specification information, container registry information, minimum computation resource limits, and an estimated task runtime.

At step 510, the scheduler 112 of the cloud-based control system 108 may schedule the at least one computing task on at least one microgrid of autonomous vehicles 118 based on the estimated runtime of the at least one computing task. The scheduler 112 may determine at least one microgrid among the one or more microgrids of autonomous vehicles 118 using deep learning for predictively scheduling the at least one computing task. The scheduler 112 may also consider the minimum resource limits provided by the user while determining the at least one microgrid for scheduling the at least one computing task. The scheduler 112 may also compare the location of the user device 102 and locations of the one or more microgrids of autonomous vehicles 118 for scheduling the at least one computing task on the one or more microgrids of autonomous vehicles 118.

In the same embodiment, the process 500 further describes that the cloud-based control system 108 transmits an indication signal to the user device 102 when the one or more autonomous vehicles 118 of the at least one microgrid are being reserved or scheduled by another user for transporting them to a destination. The process 500 describes that in response to the indication signal, the cloud-based control system 108 may receive incentive information, from the user device 102, incentivizing the one or more autonomous vehicles 118 to stay in the microgrid. The incentive information may be based on a base monetary value and completion percentage of the at least one computing task, and wherein the base monetary value is different for each of the one or more microgrids.

Accordingly, the process 500 as disclosed above distributes tasks across several autonomous vehicles 118 and takes advantage of the performance benefits of distributed computing. Further, the process utilizes deep learning to predictively schedule computing tasks to an optimal microgrid based on computing task runtimes, which prevents computing tasks from frequently being rescheduled. The process recoups the cost of the autonomous vehicles 118 and utilizes their computing power more efficiently while these vehicles are not being used and the computing resources would otherwise remain idle.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors include, by way of example, a general purpose processor, a special purpose processor, a conventional processor, a digital signal processor (DSP), a graphic processing unit (GPU), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Advantages of the embodiment of the present disclosure are illustrated herein.

In an embodiment, the present disclosure provides techniques for efficiently distributing tasks across several autonomous vehicles to take advantage of the performance benefits of distributed computing.

In an embodiment, the present disclosure provides the techniques for predictively scheduling tasks to most optimal microgrids, which prevent tasks from frequently being halted or rescheduled.

In an embodiment, the present disclosure provides techniques for recouping the cost of the autonomous vehicles and to utilize them more efficiently.

REFERENCE NUMERALS

Network 100
User device 102
Platform 104
Processing unit 106
Cloud-based control system 108
Management unit 110
Scheduler 112
Container registry 114
Database unit 116
Autonomous vehicles 118
Client 120
Reservation system 122
User 202
Monitoring unit 318
Configuration unit 320
Method 400
Method 500

The invention claimed is:

1. A method for scheduling tasks on a microgrid of autonomous vehicles, the method comprising:
receiving, from a plurality of clients of a respective plurality of autonomous vehicles, a respective activation signal that the respective one of the plurality of autonomous vehicles is plugged into a respective charging station, wherein subsequent to the receiving of the activation signal from the respective clients, the method further comprises
determining utilization rates of the plurality of autonomous vehicles based on a set of parameters, wherein the set of parameters comprises at least one of location of the respective one of the plurality of autonomous vehicles and time;
clustering the plurality of autonomous vehicles into one or more microgrids of autonomous vehicles based on the utilization rates of the plurality of autonomous vehicles;
receiving, from a user device, at least one request for performing at least one computing task, wherein the at least one request comprises an estimated runtime of the at least one computing task;

scheduling the at least one computing task on at least one of the one or more microgrids based on the estimated runtime of the at least one computing task; and receiving, from one of the clients of one of the plurality of autonomous clustered into the at least one of the one or more microgrids and while the at least one computing task is being executed by the at least one of the one or more microgrids, a reservation signal indicating that the one of the plurality of autonomous vehicles clustered into the at least one of the one or more microgrids is reserved for a transportation task, determining that the transportation task can be met by another one of the plurality of autonomous vehicles, and maintaining the one of the plurality of autonomous vehicles clustered into the at least one of the one or more microgrids in the at least one of the one or more microgrids to continue executing the at least one computing task.

2. The method of claim 1, wherein clustering the plurality of autonomous vehicles into one or more microgrids of autonomous vehicles comprises:

clustering an autonomous vehicle of the plurality of autonomous vehicles with a low utilization rate into a first microgrid of autonomous vehicles;

clustering an autonomous vehicle of the plurality of autonomous vehicles with a medium utilization rate into a second microgrid of autonomous vehicles; and clustering an autonomous vehicle of the plurality of autonomous vehicles with a high utilization rate into a third microgrid of autonomous vehicles, wherein a utilization rate is the low utilization rate if the utilization rate is less than a first threshold, the medium utilization rate if the utilization rate is more than the first threshold and less than a second threshold, and the high utilization rate if the utilization rate is more than the second threshold.

3. The method of claim 1, wherein the scheduling the at least one computing task on at least one of the one or more microgrids of autonomous vehicles further comprises:

comparing a location of the user device and locations of the one or more microgrids of autonomous vehicles; and scheduling the at least one computing task on at least one microgrid of the one or microgrids of autonomous vehicles nearest to the user device.

4. A system for scheduling tasks on a microgrid of autonomous vehicles, the system comprises:

a management unit; and a scheduler coupled with the management unit, wherein the management unit is configured to receive, from a plurality of clients of a respective plurality of autonomous vehicles, a respective activation signal that the respective one of the one or more autonomous vehicles is plugged into a respective charging station, wherein subsequent to the receiving of the activation signal from the respective clients the management unit is further configured to determine utilization rates of the plurality of autonomous vehicles based on a set of parameters, wherein the set of parameters comprises at least one of location of the respective autonomous vehicle of the plurality of autonomous vehicles and time, cluster the plurality of autonomous vehicles into one or more microgrids of autonomous vehicles based on the utilization rates of the plurality of autonomous vehicles, receive from a user device at least one request for performing at least one computing task, wherein the at least one request comprises an estimated runtime of the at least one computing task, and the scheduler is configured to schedule the at least one computing task on at least one of the one or more microgrids of autonomous vehicles based on the estimated runtime of the at least one computing task, and management unit is further configured to receive, one of the clients of one of the plurality of autonomous clustered into the at least one of the one or more microgrids and while the at least one computing task is being executed by the at least one of the one or more microgrids, a reservation signal indicating that the one of the plurality of autonomous vehicles clustered into the at least one of the one or more microgrids is reserved for a transportation task, determine that the transportation task can be met by another one of the plurality of autonomous vehicle, and maintaining the one of the plurality of autonomous vehicles clustered into the at least one of the one or more microgrids in the at least one of the one or more microgrids to continue executing the at least one computing task.

5. The system of claim 4, wherein for the clustering the plurality of autonomous vehicles into one or more microgrids of autonomous vehicles, the management unit is configured to:

cluster an autonomous vehicle of the plurality of autonomous vehicles with a low utilization rate into a first microgrid of autonomous vehicles, cluster an autonomous vehicle of the plurality of autonomous vehicles with a medium utilization rate into a second microgrid of autonomous vehicles, and cluster an autonomous vehicle of the plurality of autonomous vehicles with a high utilization rate into a third microgrid of autonomous vehicles, and wherein a utilization rate is the low utilization rate if the utilization rate is less than a first threshold, the medium utilization rate if the utilization rate is more than the first threshold and less than a second threshold, and the high utilization rate if the utilization rate is more than the second threshold.

6. The system of claim 4, wherein for scheduling the at least one computing task on at least one of the one or more microgrids of autonomous vehicles, the scheduler is further configured to:

compare a location of the user device and locations of the one or more microgrids of autonomous vehicles, and schedule the at least one computing task on at least one microgrid of the one or more microgrids of autonomous vehicles nearest to the user device.

* * * * *